2,834,735

PRODUCING AN ALCOHOL-BASE ANTIFREEZE CONTAINING AN ALKALINE EARTH METAL BORATE AS AN INHIBITOR

Robert A. Woodle, Groves, and Robert H. Howell and William B. Chandler, Port Arthur, Tex., assignors to The Texas Company, New York, N. Y., a corporation of Delaware No Drawing. Application April 23, 1954
Serial No. 425,308

12 Claims. (Cl. 252—74)

The present invention relates to a novel process for producing an alcohol-base antifreeze containing an alkaline earth metal borate as an inhibitor. More particularly, it concerns the preparation of a permanent type antifreeze consisting essentially of a polyhydric alcohol, such as an ethylene glycol, containing calcium borate as a corrosion inhibitor.

The use of calcium borate dissolved as a corrosion inhibitor in an alcohol-base antifreeze is well known. In the past calcium borate has been introduced into the alcohol by first dissolving boric acid therein, and then adding an amount of lime sufficient to react with the boric acid to convert it to calcium borate in the desired concentration. While this procedure has been used successfully to introduce the calcium ion, it has been observed that the solution inevitably is cloudy due to the presence of a finely divided solid which apparently is calcium carbonate. Consequently, in order to prepare a marketable antifreeze solution it has been necessary to filter this cloudy solution, which is a difficult procedure because of the fineness of the precipitate and the high viscosity of polyhydric alcohols such as the ethylene glycols.

The calcium borate inhibitor has been regarded as a compound having the formula $CaB_4O_7$ although it is realized that calcium borate is really not such a definite chemical compound. The literature represents calcium borate by numerous combinations of boric acid and calcium hydroxide. Chemical analysis of one commercial antifreeze shows that it contains 0.31% calcium and 0.26% boron by weight. This gives a calcium to boron mol ratio of 1:3.1. The pH of a water solution of 40% glycol containing this inhibitor will range from 7.42 to 8.0. The reserve alkalinity will range from 27 to 34. Reserve alkalinity is measured by the number of milliliters of a 0.1 N HCl solution required to titrate to a pH of 5.5 50 ml. of a water solution containing 40% of inhibited glycol.

In accordance with the present invention the above-described disadvantage of the prior art has been overcome by utilizing the principles of ion exchange with a cation exchange resin to introduce the calcium or other alkaline earth metal ion into an alcohol solution. Briefly, this is accomplished by dissolving a compound selected from the group consisting of borax and boric acid in an antifreeze alcohol, and then contacting the alcohol solution with a cation exchange resin having exchangeable cations of the calcium or other alkaline earth metal. Cation exchange resins both of the nuclear sulfonic acid type and of the carboxylic acid type have been used.

It has also been found, surprisingly, that our novel method results in a product having a higher calcium content than is obtainable by the prior art procedure described above. Since the higher calcium content results in a higher reserve alkalinity, the product prepared by ion exchange can be cut back with additional uninhibited glycol to the reserve alkalinity required in the final product.

The principles of the invention will be described below as applied to the introduction of calcium borate into anhydrous ethylene glycol. Alcohols can be inhibited similarly with different alkaline earth metal borates. The term "ethylene glycol" is intended to include mono and diethylene glycols, or mixtures thereof with one another.

In one embodiment boric acid (for example, up to 10% by weight) is first dissolved in ethylene glycol to form a clear solution, which is then passed under carefully controlled conditions through a column containing particles of the selected cation exchange resin in the calcium form. During this period the hydrogen ion of the boric acid is exchanged for the calcium ion of the resin, thus converting the resin to the hydrogen form and providing calcium borate in the glycol solution.

Superior results have been obtained with a carboxylic acid type resin. Such a resin can be formed by condensing a phenol and an aldehyde, one of which contains a carboxyl group, particularly resorcylic acid and formaldehyde; or by the copolymerization of a polymerizable acid with a divinyl compound, i. e., a compound having two $CH_2=CH-$ groups such, for example, as acrylic or methacrylic acid and divinyl benzene.

The copolymer of acrylic or methacrylic acid and divinyl benzene is preferred, and it is especially advantageous where the divinyl benzene component constitutes at most 10% of the resin composition, and preferably from 2½ to 5%.

Other methods are described on pages 55–57 of "Ion Exchange Resins," by Kunin and Myers, copyright 1950, published by John Wiley & Sons, Inc.

Resins of the carboxylic acid type are described in U. S. Patents 2,319,359; 2,333,754; 2,340,110; 2,340,111; and 2,541,420, and are characterized by their common quality of having their ion exchange ability depend upon carboxylic groups in the resin molecule.

When a carboxylic acid type cation exchange resin is purchased in the hydrogen form, it is necessary to convert it to the calcium form by treatment with a calcium compound. For example, it can be treated directly with a calcium hydroxide or calcium chloride solution; or it can first be treated with a sodium compound such as a water solution of sodium hydroxide, followed by a calcium compound solution. The conditions to be described hereinafter in the examples and under "Regeneration" are applicable to initial conversion.

EXAMPLE I

A carboxylic acid type of cation exchange resin sold under the name "Amberlite IRC–50" by the Resinous Products Division of the Rohm and Haas Chemical Company of Philadelphia, Pennsylvania, was converted from the hydrogen or "free acid" form to the calcium form by placing particles of it in a vertical column 4 feet long and 51 mm. in diameter, passing a 5% by weight sodium hydroxide solution therethrough, followed by a 10% by weight calcium chloride solution, and then rinsing the resin with water and ethylene glycol in sequence.

An ethylene glycol solution containing 3% by weight of boric acid was heated to a temperature of 180–190° F. to reduce its viscosity and passed through the column of resin at a space viscosity of 0.0099 to 0.018 milliliter per minute per milliliter resin (ml./min./ml. resin). Upon analyzing the effluent clear glycol solution it was found to contain 0.76% calcium by weight and 0.50% boron.

In carrying out the process described above it has been found that a greater degree of ion exchange occurs at low rather than at high charge rates, as shown in the example below. Where it is desired to prepare a calcium borate inhibited antifreeze containing 0.3–0.4 weight percent of calcium as a minimum, the charge rate desirably should not exceed about 0.05 ml./min./ml. resin. Regulation of charge rate is more essential in substantially anhydrous media such as the present than in aqueous solutions wherein very rapid ion exchange occurs and charge rates as high as 0.268 ml./min./ml. resin can be employed with good success.

EXAMPLE II

*Effect of charge rate on calcium exchange with "Amberlite IRC–50"*

| Run | A | B | C |
| --- | --- | --- | --- |
| Charge rate, ml./min./ml. resin | 0.01 | 0.023–0.028 | 0.046–0.055 |
| Temperature, °F | 180–200 | 180–200 | 150–160 |
| Charge Composition, wt. percent $H_3BO_3$ | 2.91 | 3.0 | 2.91 |
| Wt. percent Calcium in Product | 0.69 | 0.39 | 0.31 |

Charge rate also has an important effect on the calcium:boron ratio and the reserve alkalinity of a glycol solution. As shown in Example III, below, both of these characteristics are markedly improved by low charge rates. In each instance the charge solution contained 2.91% boric acid by weight in ethylene glyol, and the temperature was 180–200° F.

EXAMPLE III

*Effect of charge rate on Ca:B ratio and reserve alkalinity with "Amberlite IRC–50"*

| Run | D | E | F |
| --- | --- | --- | --- |
| Charge rate, ml./min./ml. resin | 0.01 | 0.018 | 0.029 |
| Wt. percent calcium in product | 0.75 | 0.46 | 0.37 |
| Ratio—Ca:B (mols) | 1:2.47 | 1:4 | 1:5 |
| Reserve alkalinity | 85 | 50 | 40 |

The amount of boric acid in the glycol solution also has an effect on the amount of calcium transferred and the ratio of Ca:B in the final product. Tests with glycol solutions containing 3% and 10% by weight of boric acid showed that the latter had a greater overall calcium content after passage over a carboxylic acid type resin, but that in the former the ratio of Ca:B was greater. Consequently, the 3% solution is preferred.

While our process is usually performed on anhydrous alcohol, tests have shown that 5% by weight of water has no apparent effect on the degree of calcium exchange.

The carboxylic acid type resin has also been used in the same maner described above for converting borax ($Na_2B_4O_7 \cdot 10H_2O$) to calcium borate in substantially anhydrous ethylene glycol solution.

EXAMPLE IV

Ethylene glycol containing 15% by weight of borax was heated to a temperature of 190° F. and passed through a column containing "Amberlite IRC–50" resin in the calcium form at a space velocity of 0.075–0.10 ml./min./ml. of resin. The resulting product was found to contain 0.53% calcium by weight, and the approximate ratio of calcium to sodium by weight was 1:3.

Another type of cation exchange resin which can be employed successfully is the nuclear sulfonic acid type. An example of such a resin is the insoluble infusible porous resinous reaction product of a sulfophthalein and formaldehyde. It can be prepared by reacting by condensing in aqueous solution under the influence of heat (1) a water soluble salt of a sulfophthalein, which is the product of condensing sulfophthalic anhydride having the formula:

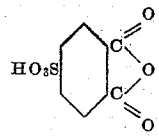

and a phenol from the class consisting of phenol, m-cresol, 3,5-dimethyl phenol, and resorcinol, and (2) formaldehyde. The formaldehyde should be condensed in the ratio of 2–4 mols per mol of the sulfophthalein salt. Condensation is continued until a gel is formed, after which the gel is dried and heated at 75°–140° C. until it is converted into a porous mass of insoluble, infusible resin. Reference is made to U. S. Patent No. 2,453,687 for further information.

Another patent, 2,518,420, discloses suitable sulfonic acid type resinous condensates in the form of insoluble, infusible, hard, spheroidal or globular particles which are phenol-aldehyde reaction products containing sulfonate groups. The preferred class has a formaldehyde to phenol ratio of 1.5:3 on a molar basis.

Reference is also made to page 55 of the aforementioned volume by Kunin and Myers for the preparation of suitable resins of the sulfonic acid type.

A nuclear sulfonic acid type cation exchanger known as "Amberlite IR–120" marketed by the Resinous Products Division of the Rohm and Haas Chemical Company was converted to the calcium form as described previously herein for "Amberlite IRC–50," and used for converting boric acid and borax to calcium borate in substantially anhydrous ethylene glycol.

EXAMPLE V

Ethylene glycol containing 5.0% by weight of boric acid was heated to a temperature of 180° F. and passed through a column containing the nuclear sulfonic acid type cation exchange resin at a space velocity of 0.075–0.10 ml./min./ml. resin. The resulting product contained 0.05% by weight of calcium.

EXAMPLE VI

Ethylene glycol containing 15% by weight of borax was heated to a temperature of 190° F. and passed through a column containing the nuclear sulfonic acid type cation exchange resin at a space velocity of 0.075–0.10 ml./min./ml. resin. The product contained 0.64% calcium by weight, and the ratio of calcium to sodium (weight) was 1:1.

The results obtained on the borax solution with sulfonic acid type resin are particularly surprising since, according to the literature, at low concentrations (aqueous) and ordinary temperatures, the extent of exchange for cation resins increases with the increasing valency of the exchanging ion ($Na^+ < Ca^{++} < Al^{+++} < Th^{++++}$) in which case the exchange of calcium ions on the resin for sodium ions in solution would be expected to be quite difficult. Apparently this series is not followed in non-aqueous media such as ethylene glycol at high temperatures and high concentrations, and the differences in the exchange "potentials" of ions of different valence diminsh and, in some cases, the ion of lower valence has the higher exchange potential.

On comparing the carboxylic acid type resin of Example IV with the nuclear sulfonic acid type resin of Example VI in their action on borax, it appears that the latter is quite superior to the former for this type of operation as shown by the higher ratio of calcium to sodium obtained in Example VI as compared with Example IV. On the other hand, by comparing Examples I and V it is apparent that carboxylic resin is superior for boric acid.

When more calcium ion is introduced than is needed in the finished antifreeze it can be blended with additional uninhibited glycol or boric acid-glycol solution to the proper final composition.

REGENERATION

After extended operation the calcium of both sulfonic acid and carboxylic acid type resins is so completely removed that further economical exchange is not possible. At this time the passing of glycol solution in contact with the resin is discontinued and the resin is regenerated by removing the sodium or hydrogen ion and substituting therefor the calcium ion. This can be done by removing the resin from the column and agitating it in a water solution of calcium hydroxide (saturated) or calcium chloride (say 1–20% by weight, and desirably 10%), or by contacting the resin in situ with a similar water solution of calcium chloride which is passed through the column.

While one-step direct regeneration is operable as described, it has been found that since the resin has a greater affinity for calcium than for sodium more complete and superior regeneration of a resin which has been used on a boric acid solution is accomplished by first converting the resin to the sodium form by contacting it with a water solution of sodium hydroxide (say 1–10% by weight, and desirably 5%), and then converting it to the calcium form with either calcium hydroxide or calcium chloride in water solutions, as described above.

Sodium hydroxide is preferable to sodium salts because the exchange of the hydrogen of the resin for sodium produces water as a by-product instead of an acid as would be the case were sodium chloride or other salt used. Calcium chloride has proved to be more effective than calcium hydroxide, undoubtedly due to its greater water solubility and the formation of the neutral salt sodium chloride instead of the strong base sodium hydroxide.

After regeneration the resin is rinsed free of excess calcium with water, excess water is removed by rinsing with hot ethylene glycol, and the resin is then ready for reuse. Water can also be removed by hot air blowing.

It is evident that continuous operation can be achieved by having two beds of cation exchange resin which are used alternately, one being regenerated while the other is on stream.

Obviously, many modifications and variations of the invention, as hereinbefore set forth, may be made without departing from the spirit and scope thereof, and therefore only such limitations should be imposed as are indicated in the appended claims.

We claim:

1. A process for producing a glycol base antifreeze containing an alkaline earth metal borate as an inhibitor, said process comprising dissolving a compound selected from the group consisting of borax and boric acid in a glycol to form a glycol solution, and then contacting said glycol solution with a cation exchange resin having exchangeable cations of said alkaline earth metal.

2. A process in accordance with claim 1 wherein said cation exchange resin is one deriving its exchange capacity essentially from carboxylic groups.

3. A process in accordance with claim 1 wherein said cation exchange is of the nuclear sulfonic acid type.

4. A process in accordance with claim 1, also comprising the step of regenerating said resin by contacting said resin with a water solution containing ions of said alkaline earth metal.

5. A process in accordance with claim 1, also comprising the preliminary steps of providing a cation exchange resin in acid form, and converting said resin to said alkaline earth metal resin by treatment with a compound of said alkaline earth metal in water solution.

6. A process in accordance with claim 1 wherein said compound is boric acid, said process also comprising regenerating said resin by first contacting said resin with a water solution of alkali metal compound, and then contacting said resin with a water solution containing ions of said alkaline earth metal.

7. A process in accordance with claim 2 wherein said compound is boric acid, and said alkaline earth metal is calcium.

8. A process in accordance with claim 3 wherein said compound is borax and said alkaline earth metal is calcium.

9. A process in accordance with claim 7, wherein said glycol solution is passed through a mass of said resin at a charge rate not exceeding .05 ml./min./ml. resin.

10. A process for producing a glycol base antifreeze containing calcium borate inhibitor which comprises dissolving a compound selected from the group consisting of borax and boric acid in glycol to form a solution and contacting said solution with a calcium cation exchange resin to form calcium borate in said solution.

11. A process for producing a monoethylene glycol base antifreeze containing calcium borate inhibitor which comprises dissolving a compound selected from the group consisting of borax and boric acid in monoethylene glycol to form a solution and contacting said solution with a calcium cation exchange resin to form calcium borate in said solution.

12. A process for producing a monoethylene glycol base antifreeze containing calcium borate inhibitor which comprises dissolving a compound selected from the group consisting of borax and boric acid in monoethylene glycol to form a solution and contacting said solution with a calcium cation exchange resin of the carboxylic acid type to form calcium borate in said solution.

References Cited in the file of this patent
UNITED STATES PATENTS

| Number | Name | Date |
| --- | --- | --- |
| 1,282,249 | Lewis | Oct. 22, 1918 |
| 1,978,447 | Austerweil | Oct. 30, 1934 |
| 2,386,182 | Balcar | Oct. 9, 1945 |
| 2,507,992 | Payne et al. | May 16, 1950 |
| 2,599,558 | Juda et al. | June 10, 1952 |

OTHER REFERENCES

I & E Chemistry, vol. 43, No. 3, pages 741–746.

U. S. DEPARTMENT OF COMMERCE
PATENT OFFICE

CERTIFICATE OF CORRECTION

Patent No. 2,834,735    Robert A. Woodle et al.      May 13, 1958

It is hereby certified that error appears in the printed specification of the above numbered patent requiring correction and that the said Letters Patent should read as corrected below.

Column 2, line 62, for "space viscosity" read --space velocity--; column 4, line 54, for "diminsh" read --diminish--.

Signed and sealed this 1st day of July 1958.

(SEAL)
Attest:
KARL H. AXLINE
Attesting Officer

ROBERT C. WATSON
Commissioner of Patents